United States Patent
Haruyama et al.

(10) Patent No.: US 8,906,544 B2
(45) Date of Patent: Dec. 9, 2014

(54) TERMINAL SECTION FOR STORAGE BATTERY, NUT FOR TERMINAL OF THE SAME TERMINAL SECTION FOR STORAGE BATTERY, LID FOR STORAGE BATTERY WITH THE SAME TERMINAL SECTION FOR STORAGE BATTERY, AND STORAGE BATTERY

(75) Inventors: Hiroshi Haruyama, Kyoto (JP); Shin Osaki, Kyoto (JP); Eiji Hojo, Kyoto (JP); Yasuhide Nakayama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 46 days.

(21) Appl. No.: 13/518,722

(22) PCT Filed: Dec. 22, 2010

(86) PCT No.: PCT/JP2010/073096
§ 371 (c)(1),
(2), (4) Date: Jun. 22, 2012

(87) PCT Pub. No.: WO2011/078210
PCT Pub. Date: Jun. 30, 2011

(65) Prior Publication Data
US 2012/0263997 A1 Oct. 18, 2012

(30) Foreign Application Priority Data
Dec. 24, 2009 (JP) ................................. 2009-292979

(51) Int. Cl.
H01M 2/30 (2006.01)
H01R 11/28 (2006.01)
F16B 37/04 (2006.01)
H01M 10/06 (2006.01)

(52) U.S. Cl.
CPC ............. H01M 2/305 (2013.01); H01R 11/281 (2013.01); F16B 37/044 (2013.01); H01M 10/06 (2013.01); Y02E 60/126 (2013.01); H01M 2/307 (2013.01)
USPC ............ 429/170; 439/339; 439/765; 439/779

(58) Field of Classification Search
USPC ........................................................ 429/170
See application file for complete search history.

(56) References Cited

U.S. PATENT DOCUMENTS

| | | | | |
|---|---|---|---|---|
| 4,898,796 A | * | 2/1990 | Furukawa et al. | 429/178 |
| 2008/0241686 A1 | * | 10/2008 | Sugie et al. | 429/211 |
| 2011/0039153 A1 | * | 2/2011 | Nakayama et al. | 429/181 |
| 2012/0264002 A1 | * | 10/2012 | Osaki et al. | 429/176 |

FOREIGN PATENT DOCUMENTS

| | | |
|---|---|---|
| JP | 01-124954 | 5/1989 |
| JP | 07-27053 | 5/1995 |
| WO | 2009/131228 | 10/2009 |

OTHER PUBLICATIONS

International Search Report dated Apr. 12, 2011.

* cited by examiner

Primary Examiner — Ula C. Ruddock
Assistant Examiner — Scott J Chmielecki
(74) Attorney, Agent, or Firm — Rankin, Hill & Clark LLP

(57) ABSTRACT

An object of the invention is to provide a terminal section for storage battery that allows external leading wires to be simultaneously attached thereto at two or more locations, a nut for terminal of the terminal section for storage battery, a lid for storage battery with the terminal section for storage battery, and a storage battery.

There is provided a terminal section for storage battery 8 which is made up of a terminal 4 having a cavity portion into which a nut is inserted, a bushing 6, and a conductive portion 7 joining both, wherein the terminal 4 has a rectangular parallelepiped shape, and through-holes 4K1, 4K2 of the terminal 4 are formed at least at two locations of a rectangular upper surface plate portion and a rectangular front surface plate portion, and at positions where screw holes of the nut communicating with the through-holes 4K1, 4K2 of the terminal 4 do not intersect with each other, when the nut is inserted into the cavity portion of the terminal 4. Moreover, the nut for terminal to be inserted into the cavity portion of the terminal 4 of the terminal section for storage battery 8, and a lid for storage battery with the terminal section for storage battery 8, and a storage battery are provided.

17 Claims, 5 Drawing Sheets

CHAMFERED TO PREVENT VERTICAL AND LATERAL WRONG INSERTION

STEPPED TO PREVENT VERTICAL AND LATERAL WRONG INSERTION (UPPER SURFACE WIRE CONNECTION)   (FRONT SURFACE WIRE CONNECTION)

TERMINAL SECTION FOR STORAGE BATTERY, NUT FOR TERMINAL OF THE SAME TERMINAL SECTION FOR STORAGE BATTERY, LID FOR STORAGE BATTERY WITH THE SAME TERMINAL SECTION FOR STORAGE BATTERY, AND STORAGE BATTERY

TECHNICAL FIELD

The present invention relates to a storage battery especially suitable for mounting on a motorcycle, and particularly to a terminal section for storage battery, a nut for terminal of the terminal section for storage battery, a lid for storage battery with the terminal section for storage battery, and a storage battery.

BACKGROUND ART

In the above-mentioned storage battery suitable for mounting on the motorcycle, tubular bushings each of which a pole projected upwardly from a container side is inserted into to be welded are included inside a lid, and terminals arranged in notched portions formed on a horizontally front side from the bushings are joined to the bushings, by which a vertically compact storage battery preventing the terminals from protruding from the lid can be constructed. The above-described constitution has an advantage of making output larger than that of a conventional storage battery, when the storage battery of a size similar to the conventional one is constructed, and has been used in recent years.

As the above-described storage battery, as shown in FIG. 6, there is publicly known a storage battery in which a notched portion 3 or a depressed portion is formed in a lid 2 made of synthetic resin to close a container and a terminal 4 is included in the notched portion 3 or the depressed portion, a tubular bushing 6 is included inside the lid 2, into which a pole 5 extending from the container to extract electric power is inserted to be welded, a conductive portion 7 to join an upper side of this bushing 6 and a lower side of the terminal 4 horizontally apposed to the bushing 6 is included, an auxiliary lid 9 to cover the bushing 6 included inside the lid 2 from above is included, wherein the terminal 4, the bushing 6 and the conductive portion 7 make up a terminal section 8 by integral molding, an annular protruded portion 7T protruded outwardly on a side surface of the conductive portion 7 is included, and in the terminal section 8, at least a lower portion 6B of the bushing 6 and the conductive portion 7 are buried in the lid 2 by insert molding (refer to Patent Document 1).

Moreover, a storage battery with a similar structure is also described in Patent Document 2.

As described in a paragraph [0017] of Patent Document 1, a connection of an external leading wire to the above-described storage battery is made by positioning a nut in an internal portion (cavity portion) of the terminal 4 (inserting the nut in a rectangular parallelepiped shape into the cavity portion from a square socket of a left plate portion 4D of the terminal 4 shown in FIG. 7), and inserting bolts from through-holes 4K1, 4K2 formed in a top plate portion (upper surface plate portion) 4A and a front plate portion (front surface plate portion) 4B and screwing the same.

However, since the nut described in Patent Document 1 has one screw hole as shown in FIG. 5 (2), and the bolt can be inserted only from any one of the through-holes 4K1, 4K2, orientation of the nut needs to be changed in each case so as to match the through-hole to which the external leading wire is desired to be connected, and the screw hole of the nut, as shown in FIG. 5 (1) and thus, there has been a problem that the external leading wires cannot be attached simultaneously at two positions.

RELATED ART DOCUMENTS

Patent Documents

Patent Document 1: Japanese Patent Application Laid-Open No. 2009-043441
Patent Document 2: WO 2009-131228 A1

SUMMARY OF THE INVENTION

Problems to be Solved by the Invention

The present invention is to solve the above-described problems, and an object thereof is to provide a terminal section for storage battery that allows external leading wires to be simultaneously attached thereto at two or more locations, a nut for terminal of the terminal section for storage battery, a lid for storage battery with the terminal section for storage battery, and a storage battery.

Means for Solving the Problems

The present invention employs the following means in order to solve the above-described problems.

(1) A terminal section for storage battery which is made up of a terminal having a cavity portion into which a nut is inserted, a bushing, and a conductive portion joining both, wherein the terminal has a rectangular parallelepiped shape, and through-holes of the terminal are formed at least at two locations of a rectangular upper surface plate portion and a rectangular front surface plate portion, and at positions where screw holes of the nut communicating with the through-holes of the terminal do not intersect with each other, when the nut is inserted into the cavity portion of the terminal.

As is well-known, the bushing has a tubular shape, into which a pole extending from an element inside a container is inserted to be welded, and the terminal section is made up by integrally molding the terminal, the bushing and the conductive portion joining both.

(2) The terminal section for storage battery according to the foregoing (1), wherein one of the though holes of the terminal is formed at a left or right-hand position of the rectangular upper surface plate portion, and the other through-hole is formed at an opposite right or left-hand position of the rectangular front surface plate portion.

(3) A nut for terminal which is inserted into the cavity portion of the terminal of the terminal section for storage battery according to the foregoing (1) or (2), wherein the nut has a rectangular parallelepiped shape, and screw holes of the nut are formed at least at two locations of a location from a rectangular upper surface toward a lower surface and a location from a rectangular front surface toward a back surface, and at positions where the holes do not intersect with each other.

(4) The nut for terminal according to the foregoing (3), wherein one of the screw holes of the nut is formed at the location from the upper surface toward the lower surface at a left or right-hand position of the rectangle, and the other screw hole is formed at the location from the front surface toward the back surface at an opposite right or left-hand position of the rectangle.

(5) A lid for storage battery in which a terminal section made up of a terminal having a cavity portion, a bushing, and a conductive portion joining both is insert-molded in a lid made of synthetic resin, wherein the terminal and a nut to be inserted into the cavity portion of the terminal each have a rectangular parallelepiped shape, through-holes of the terminal are formed at least at two locations of a rectangular upper surface plate portion and a rectangular front surface plate portion, and screw holes of the nut are formed at least at two locations of a location from a rectangular upper surface toward a lower surface and a location from a rectangular front surface toward a back surface, and at positions where the holes do not intersect with each other, and the nut is inserted into, and fixed to the cavity portion of the terminal so that the through-holes of the terminal and the screw holes of the nut communicate with each other.

(6) The lid for storage battery according to the foregoing (5), wherein one of the through-holes of the terminal and one of the screw holes of the nut are each formed at a left or right-hand position of the rectangle, and the other through-hole and the other screw hole are each formed at an opposite right or left-hand position of the rectangle.

(7) A storage battery which includes a container made of synthetic resin in which an inside thereof is partitioned into a plurality of cells by partition walls, and an element is contained in each of the cells, and a lid to cover the container from above, comprising the lid for storage battery according to the foregoing (5) or (6).

(8) A storage battery which includes a container made of synthetic resin in which an inside thereof is partitioned into a plurality of cells by partition walls, and an element is contained in each of the cells, and a lid to cover the container from above, wherein the lid comprises the terminal section for storage battery according to the foregoing (1) or (2).

Effect of the Invention

The terminal section for storage battery and the nut for terminal of the terminal section for storage battery in the present invention are employed to construct the lid for storage battery and the storage battery, which allows the external leading wires to be simultaneously attached to the storage battery at the two or more locations.

BRIEF DESCRIPTION OF THE DRAWINGS

FIG. 3 (2) is a photograph showing a nut to be inserted into the terminal of the storage battery of the present invention.

FIG. 5 (2) is a photograph showing a nut to be inserted into the terminal of the conventional storage battery.

MODE FOR CARRYING OUT THE INVENTION

Figure 1:
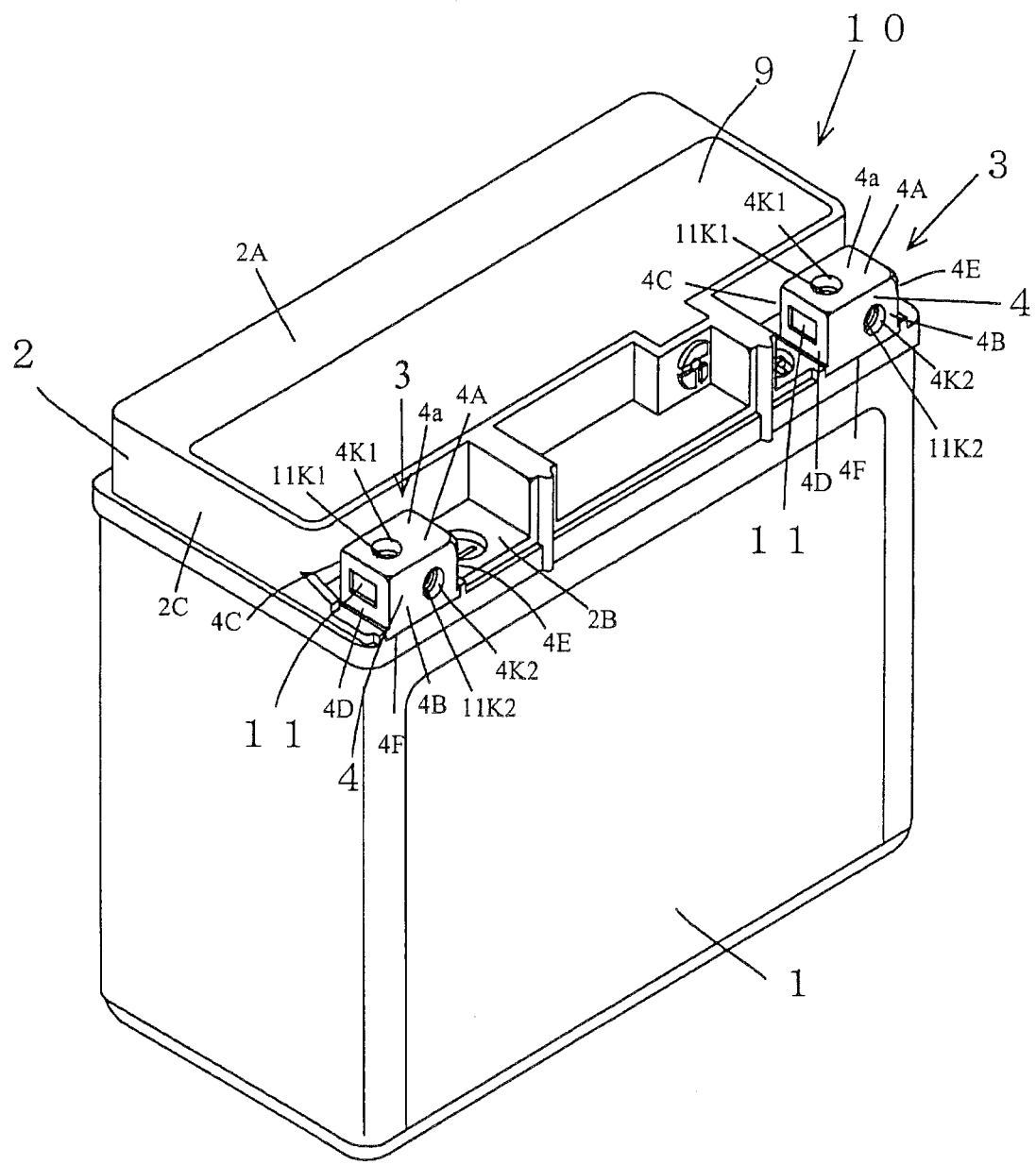
FIG. 1 is a perspective view of a storage battery of the present invention.

FIG. 1 shows a perspective view of a storage battery of the present invention. This storage battery 10 includes a container 1 having a rectangular shape in a planar view, a lid 2 made of synthetic resin and having a rectangular shape in a planar view to close an upper end opening of this container 1, and an auxiliary lid 9 to close an upper end opening of this lid 2.

As shown in FIG. 1, notched portions 3 are formed at the respective two corner portions on both sides of one long side of the lid 2 among four corner portions of the rectangular lid 2, and in these notched portions 3, 3 are arranged terminals 4, 4 respectively constituting a positive electrode and a negative electrode (the right terminal is a positive terminal, and the left terminal is a negative terminal), respectively, so that upper surfaces 4a, 4a of upper surface plate portions 4A, 4A of the terminals 4, 4 are not projected from an upper end 2A of the lid 2. While, here, the terminals 4, 4 are arranged in the notched portions 3, 3 formed at the corner portions of the lid 2, depressed portions may be formed in portions on the inner side of the lid 2, and the terminals 4, 4 may be arranged in these formed depressed portions, respectively.

In the present invention, in order to allow the external leading wires to be simultaneously attached at two or more locations, a terminal section for storage battery and a nut for terminal of a storage battery as described below are employed.

Figure 2:
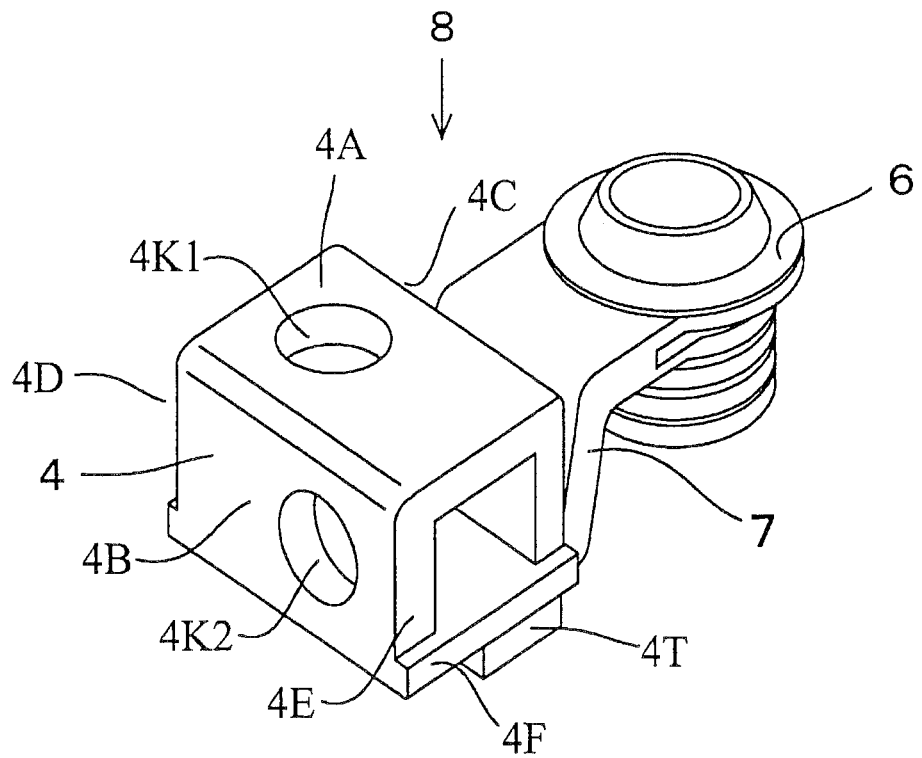
FIG. 2 is a perspective view of a terminal section for storage battery of the present invention.
Figure 3:
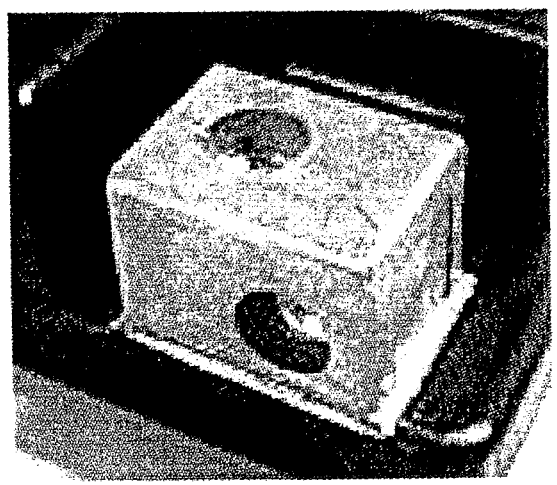
FIG. 3 (1) is a photograph showing a terminal of the storage battery of the present invention.
Figure 3:
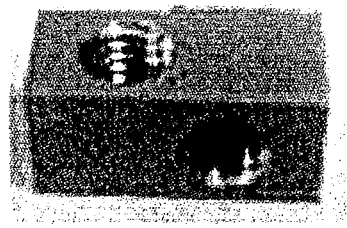

While as the terminal section for storage battery of the present invention, as shown in FIG. 2 and FIG. 3 (1), there is employed a conventional terminal section 8 made up by integrally molding the terminal 4 having a cavity portion into which the nut is inserted, a tubular bushing 6 into which a pole 5 extending from an element inside the container is inserted to be welded, and a conductive portion 7 joining both, positions of through-holes 4K1, 4K2 of the terminal 4 are different.

As shown in FIGS. 1, 2, the terminal 4 has a rectangular parallelepiped shape with the cavity portion, and includes the rectangular upper surface plate portion 4A, and a rectangular front surface plate portion 4B, a rectangular rear plate portion 4C, a left plate portion 4D, and a right plate portion 4E, these four plate portions extending downwardly from four sides of this upper surface plate portion 4A, and the through-holes 4K1, 4K2 to cause bolts to penetrate are formed in the upper surface plate portion 4A and the front surface plate portion 4B, and further, in the right plate portion 4E, a square socket to insert the nut into the cavity portion from a lateral direction is formed. At this time, when a nut 11 is inserted into the cavity portion of the terminal 4, the one through-hole 4K1 is formed at a left-hand position in the rectangle, and the other through-hole 4K2 is formed at a right-hand position in the rectangle, lest screw holes 11K1, 11K2 of the nut communicating with the through-holes 4K1, 4K2 of the terminal 4 intersect with each other.

The terminal 4 is not limited to the rectangular parallelepiped, but the right and left terminals may not necessarily be similar in shape, and the position of the through-hole 4K1 in the upper surface plate portion 4A and the position of the through-hole 4K2 in the front surface plate portion 4B are not limited to the illustration.

As shown in FIGS. 1 and 3 (2), the nut 11 to be inserted into the cavity portion of the terminal 4 also has a rectangular parallelepiped shape, and the nut 11 is formed with the screw holes at the two locations of the location 11K1 from a rectangular upper surface toward a lower surface, and the location 11K2 from a rectangular front surface toward a back surface. At this time, as to the screw holes 11K1, 11K2 at the two locations, one of the screw holes is formed at a left-hand position in the rectangle and the other screw hole is formed at a right-hand position of the rectangle, lest they intersect with each other.

The above-described terminal section and the nut for terminal are employed, and the nut 11 is inserted into the cavity portion of the terminal 4 so that the through-hole 4K1 of the terminal communicates with the screw hole 11K1 of the nut, and the through-hole 4K2 of the terminal communicates with the screw hole 11K2 of the nut to construct the storage battery 10 shown in FIG. 1, by which the bolts (not shown) are inserted from both the through-holes 4K1 and 4K2 in the upper surface and the front surface to screw terminal ends of the bolts into the nut. The external leading wires (wires connectable to electric components or the like) not shown or the like are each sandwiched and fixed between the bolt and the nut.

Since the holes can be provided at three or more locations in place of at the two locations, as needed, the external leading wires can be simultaneously attached to the storage battery at two or more locations.

Figure 4A:
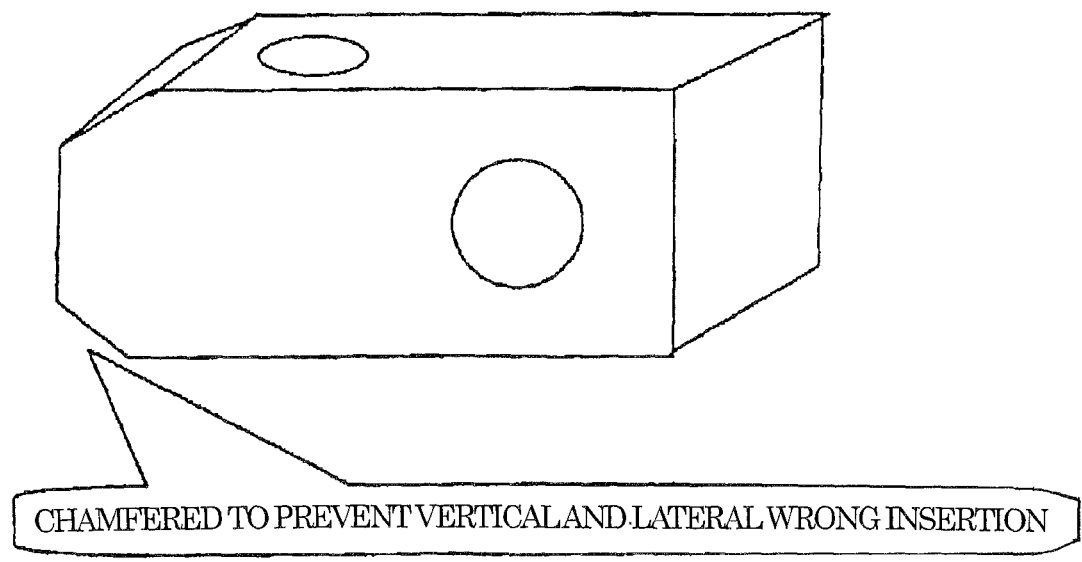
FIGS. 4 (a) and 4 (b) are perspective views showing examples of the nut to be inserted into the terminal of the storage battery of the present invention.
Figure 4B:
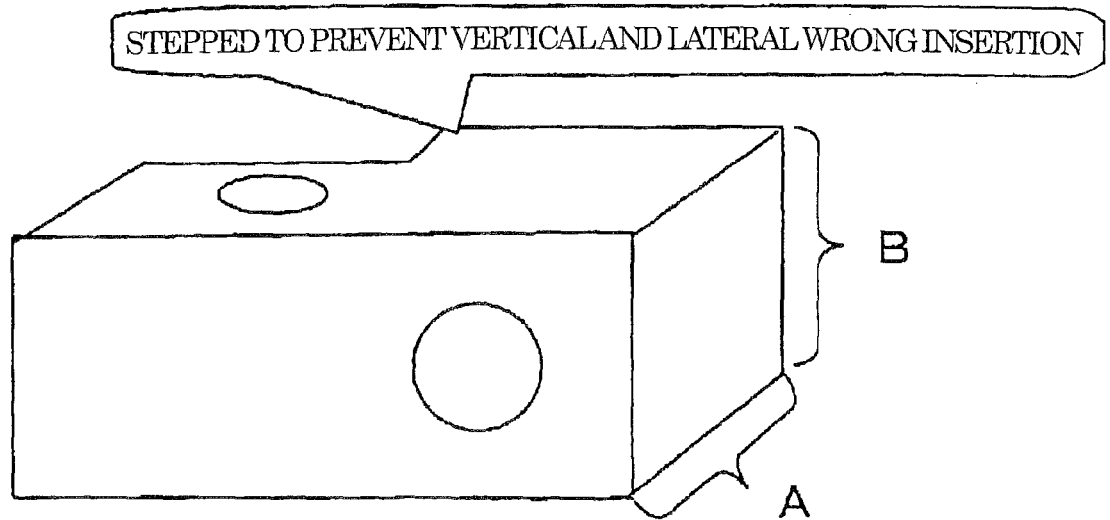
Figure 5:
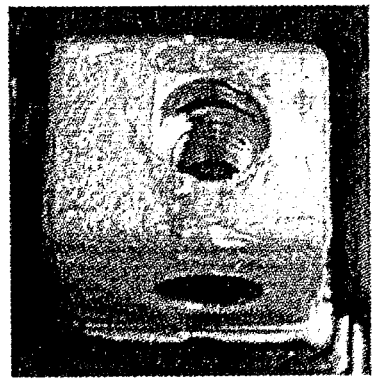
FIG. 5 (1) is a photograph showing a terminal of a conventional storage battery.
Figure 5:
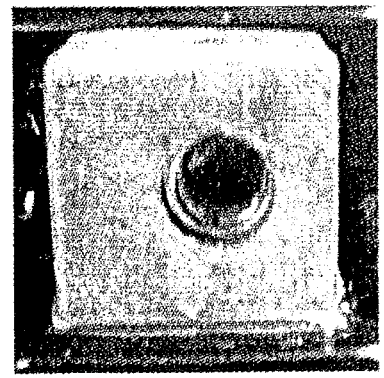
Figure 5:
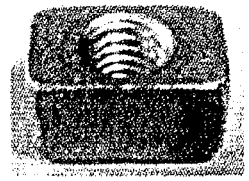

The nut is not limited to the rectangular parallelepiped shape, but as shown in FIGS. 4 (a), 4 (b), in order to enable wrong insertion in the vertical or horizontal direction to be prevented, a chamfered nut or a stepped nut may be used. Moreover, it can also be considered that a lateral dimension A and a longitudinal dimension B in FIG. 4 (b) are changed to prevent the wrong insertion.

Furthermore, since the terminal and the nut of the present invention only need to be formed with the holes at the right and left-hand positions, even when they each have a cubic shape, the holes only need to be formed at right and left-hand positions of square surfaces.

In the present invention, the rectangular parallelepiped shape as collective designation includes the above-described anomalous ones and cubic ones, and as to the surface thereof, the rectangular shape as collective designation also includes anomalous ones and square ones.

Figure 6:
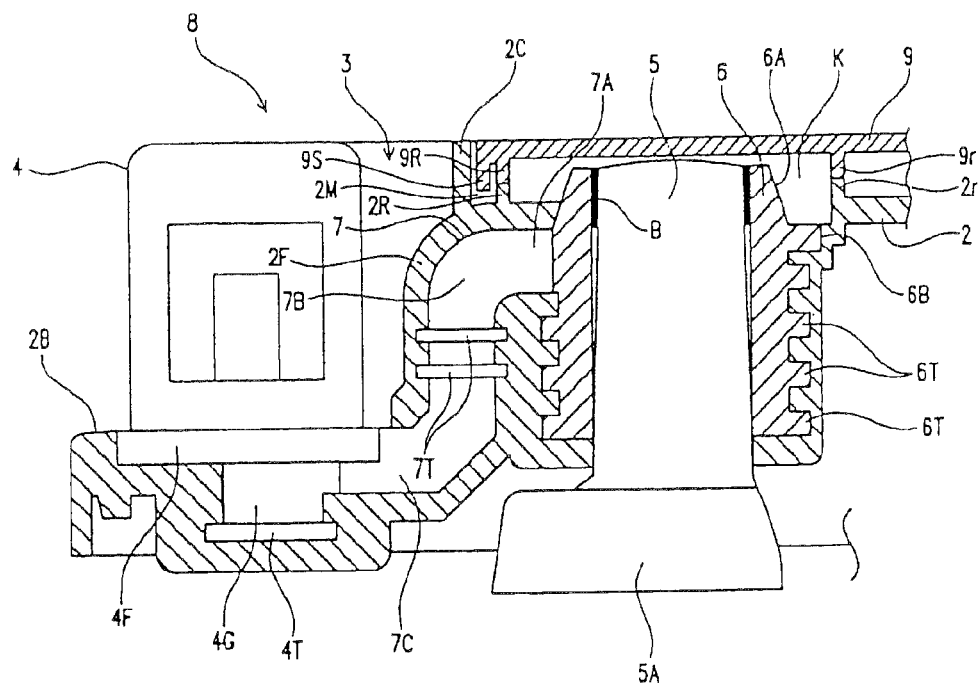
FIG. 6 is a cross-sectional view of the terminal section buried in a lid with a conventional auxiliary lid attached.
Figure 7:
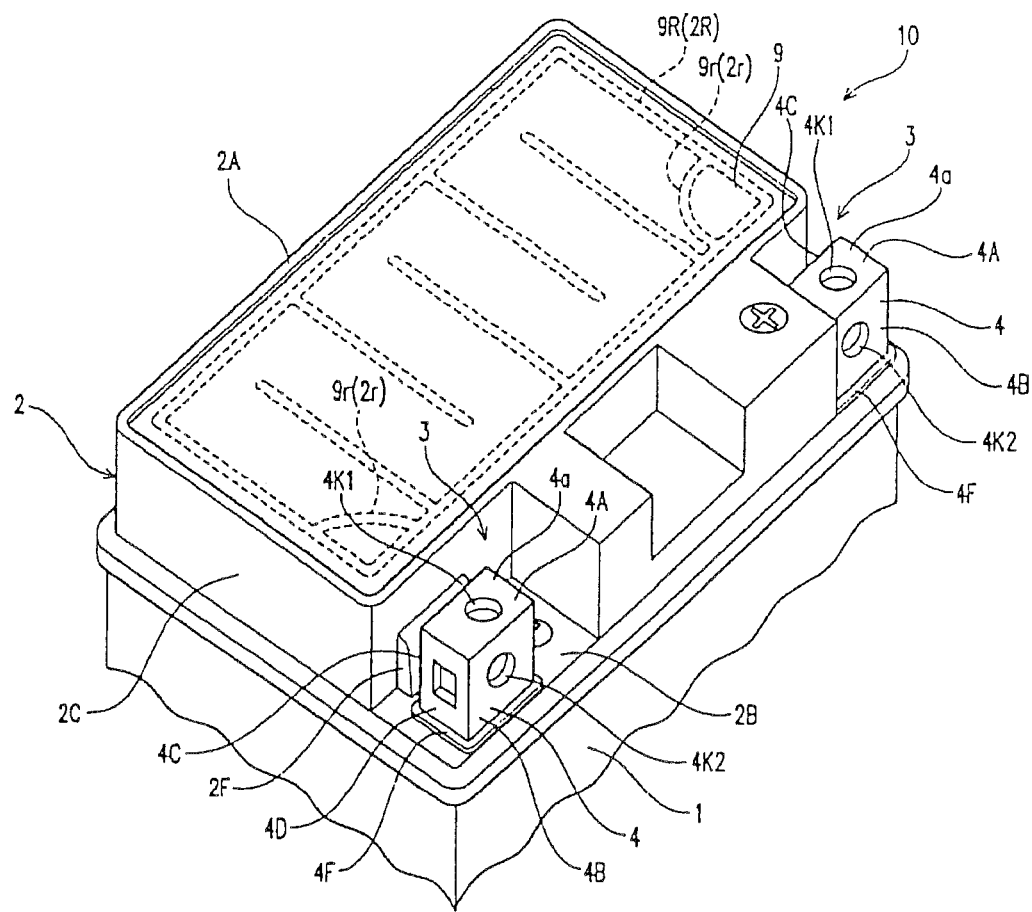
FIG. 7 is a perspective view showing an upper side of the conventional storage battery.

A basic structure of the lid for battery storage of the present invention is similar to the conventional one shown in FIG. 6. Hereinafter, based on FIG. 6, the structure of the lid for storage battery of the present invention will be described. Inside the lid 2 are included the tubular bushings 6 each of which the pole 5 extending from the element (not shown) of the container 1 to extract electric power is inserted into to be welded. The conductive portion 7 to join an upper side of the bushing 6 and a lower side of the terminal 4 horizontally apposed to the bushing 6 is included, and the terminal 4, the bushing 6 and the conductive portion 7 are integrally molded, using lead or lead alloy to thereby make up the terminal section 8. Reference numeral 5A shown in FIG. 6 denotes a strap integrated with a lower end of the pole 5. Moreover, a blacked-out portion B in the figure denotes a welded portion where the bushing 6 and the pole 5 are subjected to burner welding, which is advantageous in terms of strength as compared with soldering.

Furthermore, the rectangular auxiliary lid 9 to cover the bushings 6 included inside the lid 2 from above, that is, to close an opening of the upper end 2A of the lid 2 is included. This auxiliary lid 9 is put over the lid 2 after thermally melting a lower side of the auxiliary lid 9, by which the auxiliary lid 9 can be firmly fixed in a state where the opening of the lid 2 is sealed closely. That is, after thermally melting a lower side of a rib 9R (9r) of the auxiliary lid 9, a skirt portion 9S of the auxiliary lid 9 is put into a groove portion 2M, and the rib 9R (9r) of the auxiliary lid 9 is pressed to a rib 2R (2r) of the lid 2 to thereby weld the rib 9R (9r) of the auxiliary lid 9 to the rib 2R (2r) of the lid 2, which can put an inside surrounded by the ribs 9R (9r), 2R (2r) into a closely sealed state.

Lower portions 6B excluding upper portions 6A of the bushings 6 in the terminal sections 8, and the conductive portions 7 are buried in the lid 2 by insert molding. Vertical plate portions 7B of the conductive portions 7 are covered with bulging portions 2F, 2F bulging from a vertical plate portion 2C of the lid 2 to the terminal 4 side. The bushings 6 are insert-molded into the lid 2 as described before, and further, a plurality of annular protruded portions 6T are preferably included along the vertical direction outside each of the bushings 6. This makes it difficult for electrolyte solution from the storage battery 10 to move into an upper space K of the lid 2 from between each of the bushings 6 and the lid 2, and even if the electrolyte solution moves from between the bushing 6 and the lid 2 into the upper space K of the lid 2, it is difficult for the electrolyte solution to leak out to a surface of the auxiliary lid 9 (outside the storage battery 10), because the inside surrounded by the ribs 9R (9r), 2R (2r) is put into the closely sealed state.

Each of the conductive portions 7 is made up of a first horizontal plate portion 7A extending horizontally from an upper portion of the bushing 6, the vertical plate portion 7B extending downwardly from an end portion of this first horizontal plate portion 7A, and a second horizontal plate portion 7C extending horizontally from a lower end of this vertical plate portion 7B to be connected to a lower portion of the terminal 4, and two (one, or three or more) annular protruded portions 7T protruded outwardly in the vicinity of a central portion of the vertical plate portion 7B may be included at predetermined intervals. In this case, as described before, the electrolyte solution that has moved into the upper space K of the lid 2 can be more surely prevented by the protruded portions 7T, 7T from moving to the terminal 4 through a gap between the conductive portion 7 and the bulging portion 2F of the lid 2.

Since the protruded portions 7T are to prevent the movement of the electrolyte solution to the terminal 4, a shape that can make a creepage distance longer, for example, annular depressed portions may be employed, or this annular depressed portion and the annular protruded portion 7T may be combined.

The terminal section for storage battery of the present invention shown in FIG. 2 is manufactured by the following method.

The terminal 4, the bushing 6, and the conductive portion 7 are integrally molded, employing a casting process of lead or lead alloy to thereby manufacture the terminal section 8. It is preferable that the lead or the lead alloy is cast, using a die so that the rectangular parallelepiped terminal 4 has the cavity portion, and in the terminal 4, the through-holes 4K1, 4K2 are formed at the right and left-hand positions of the rectangular upper surface plate portion 4A and the rectangular front surface plate portion 4B.

A method can be employed, in which molten lead or molten lead alloy is poured into a portion where the terminal 4 is manufactured, and a portion where the bushing 6 is manufactured in the die to manufacture the terminal section 8. Since the conductive portion 7 to join the upper side of the bushing 6 and the lower side of the terminal 4 apposed horizontally to the bushing 6 is connected in such a manner that the die is connected so as to vertically reverse postures of the bushing 6 and the terminal 4, the conductive portion 7 is formed of the molten metal on the bushing 6 side or the molten metal overflowing from the terminal 4 side.

As the lead alloy, Pb—Ca—Sn alloy, Pb—Sn alloy, Pb—Ca alloy, Pb—Sb alloy or the like can be used.

When the terminal section 8 manufactured as described above is used to manufacture the lid for storage battery 2, the nut 11 having the screw holes at the two locations is inserted into the cavity portion of the terminal 4 having the through-holes at the two locations so that the through-hole 4K1 of the terminal and the screw-hole 11K1 of the nut, and the through-hole 4K2 of the terminal and the screw-hole 11K2 of the nut communicate with each other, respectively. The terminal sections 8 each with the nut 11 inserted are inserted into a molding die of the lid 2 to injection-mold the synthetic resin. The bottom portions 4F of the terminals 4 made of the lead or lead alloy are deformed by the injection molding pressure, and the nuts 11 are fixed to the cavity portions of the terminals 4, by which the lid for storage battery 2 shown in FIG. 1 is manufactured.

Furthermore, while since the nut 11 is not lead or lead alloy, the nut 11 inserted into the cavity portion needs to be separated at the time of recycle of the terminal 4 made of lead or lead alloy, in the present invention, in which the nut is fixed by deforming the bottom portion 4F of the terminal 4, the nut can be easily separated from the terminal by strongly hitting the inserted nut, which is preferable in terms of recycle.

In the present invention, by employing the injection molding method of the lid 2 as described above, the lid for storage battery 2 is obtained, in which at least the lower portions 6B of the bushings and the conductive portions 7 in the terminal sections 8 each resulting from integrally molding the terminal 4, the bushing 6 and the conductive portion 7 are buried in the lid 2 by the insert molding, and the bottom portions of the terminals 4 are deformed by the injection molding pressure of the synthetic resin at the time of the insert molding, so that the nuts 11 are pressed and fixed to the cavity portions of the terminals 4.

Moreover, since in the present invention, the external leading wires can be simultaneously attached to the storage battery at the two or more locations, the present invention is not limited to the case where the lid is manufactured, using the above-described injection molding method, but also includes a case where using the terminal section for storage battery which is made up by integrally molding the terminal 4 in the rectangular parallelepiped shape having the cavity portion, the bushing 6 and the conductive portion 7, and the through-holes 4K1, 4K2 of the terminal 4 are formed at the two locations of the rectangular upper surface plate portion and the rectangular front surface plate portion, and at the positions where the screw holes 11K1, 11K2 of the nut 11 communicating with the through-holes 4K1, 4K2 of the terminal 4 do not intersect with each other, the lid for storage battery is manufactured by insert-molding similarly to the conventional one, and at the time of connection of the external leading wires to the storage battery, the nut having the rectangular parallelepiped shape where the screw holes 11K1, 11K2 of the nut 11 are formed at the two locations of the location from the rectangular upper surface toward the lower surface, and the location from the rectangular front surface toward the back surface, and at the positions where the holes do not intersect with each other is inserted into the cavity portion of the terminal 4 so that the through-holes 4K1, 4K2 of the terminal 4 and the screw holes 11K1, 11K2 of the nut 11 communicate with each other to construct the storage battery.

In the case where at the time of connection of the external leading wires to the storage battery, the nut is inserted into the cavity portion of the terminal, as shown in FIG. 6, a plate-like oval anchor portion 4T can be integrally formed, which is buried in the resin at the time of lid molding at a lower end of the terminal 4 and exerts an anchor effect. The anchor portion 4T may be formed separately to be integrated with the lower end of the terminal 4 by welding or the like. The anchor portion 4T is integrally formed with a dimension larger than a joining portion 4G in a planar view at a lower end of the joining portion 4G extending integrally downwardly from the flat plate-like bottom portion 4F formed integrally at the lower end of the terminal 4.

In the case when the nut is inserted into the cavity portion of the terminal to be insert-molded, the bottom portion of the terminal 4 needs to be deformed, although projecting the anchor portion at a center of the bottom portion as described above makes it difficult to deform the bottom portion of the terminal 4. Consequently, when the anchor portion is projected, on the bottom portion 4F of the terminal 4, the anchor portion having a notch in the central portion, for example, the U-shaped anchor portion, in which the central portion of a plate is largely notched, thereby removing a thickness of the central portion, is projected, so that the bottom portion of the terminal with a small thickness corresponding to the notch is deformed. In the present invention, the anchor portion does not need to cover the whole surface of the bottom portion of the terminal, but the deformable portion having the small thickness only needs to be left on the bottom portion of the terminal, and thus, the anchor portion is not limited to the U shape, but may have a notch having another shape, or the anchor portion only needs to be projected at the location excluding at least the central portion of the bottom portion, such as an anchor portion having a hole in the central portion, an anchor portion in two rows having a space in the central portion, and the like.

The lid for storage battery of the present invention can be applied to a container of a normal lead-acid battery, that is, the container made of synthetic resin, in which an inside thereof is partitioned into a plurality of cells by partition walls, an element is contained in each of the cells, and the poles extending from the elements are included, and as described above, the poles 5 extending from the elements inside the container 1 are welded to the bushings 6 of the lid 2 put over from above, which enables the electric power to be extracted.

DESCRIPTION OF REFERENCE NUMERALS

1: container
2: lid
2A: upper end
2B: bottom surface
2C: vertical plate portion
2F: bulging portion
2M: groove portion
2R (2r): rib
3: notched portion
4: terminal
4A: top plate portion (upper surface plate portion)
4B: front plate portion (front surface plate portion)
4C: rear plate portion
4D: left plate portion
4E: right plate portion
4F: bottom portion
4G: joining portion
4K1, 4K2: through-hole
4T: anchor portion
4a: upper surface
5: pole
6: bushing
6A: upper portion
6B: lower portion
6T: protruded portion
7: conductive portion
7A: horizontal plate portion
7B: vertical plate portion
7C: horizontal plate portion 7T: protruded portion
8: terminal section
9: auxiliary lid
9R (9r): rib
9S: skirt portion
10: storage battery
11: nut
11K1, 11K2: screw hole
B: welded portion
K: space

INDUSTRIAL APPLICABILITY

The storage battery of the present invention includes the terminal section, the nut for terminal, and the lid for storage battery of the present invention, which makes the storage battery compact, and allows the external leading wires to be simultaneously attached at the two or more locations, and thus, the storage battery is useful as a storage battery for motorcycle.

The invention claimed is:

1. A terminal section for storage battery comprising:
a terminal having a cavity portion into which a nut is inserted, a bushing, and
a conductive portion joining both,
wherein the terminal has a rectangular parallelepiped shape,
through-holes of the terminal are formed at least at two locations of a rectangular upper surface plate portion and a rectangular front surface plate portion, and at positions where screw holes of the nut communicating with the through-holes of the terminal do not intersect with each other, when the nut is inserted into the cavity portion of the terminal, and
the nut has a rectangular parallelepiped shape, and screw holes of the nut are formed at least at two locations of a location from a rectangular upper surface toward a lower surface and a location from a rectangular front surface toward a back surface, and at positions where the holes do not intersect with each other.

2. The terminal section for storage battery according to claim 1, wherein one of the through-holes of the terminal is formed at a left or right-hand position of the rectangular upper surface plate portion, and the other through-hole is formed at an opposite right or left-hand position of the rectangular front surface plate portion.

3. A nut for terminal which is inserted into the cavity portion of the terminal of the terminal section for storage battery according to claim 1, wherein one of the screw holes of the nut is formed at the location from the upper surface toward the lower surface at a left or right-hand position of the rectangle, and the other screw hole is formed at the location from the front surface toward the back surface at an opposite right or left-hand position of the rectangle.

4. A lid for storage battery in which a terminal section comprising a terminal having a cavity portion, a bushing, and a conductive portion joining both is insert-molded in a lid made of synthetic resin, wherein the terminal and a nut to be inserted into the cavity portion of the terminal each have a rectangular parallelepiped shape, through-holes of the terminal are formed at least at two locations of a rectangular upper surface plate portion and a rectangular front surface plate portion, and screw holes of the nut are formed at least at two locations of a location from a rectangular upper surface toward a lower surface and a location from a rectangular front surface toward a back surface, and at positions where the holes do not intersect with each other, and the nut is inserted into, and fixed to the cavity portion of the terminal so that the through-holes of the terminal and the screw holes of the nut communicate with each other.

5. The lid for storage battery according to claim 4, wherein one of the though holes of the terminal and one of the screw holes of the nut are each formed at a left or right-hand position of the rectangle, and the other through-hole and the other screw hole are each formed at an opposite right or left-hand position of the rectangle.

6. A storage battery which includes a container made of synthetic resin in which an inside thereof is partitioned into a plurality of cells by partition walls, and an element is contained in each of the cells, and a lid to cover the container from above, comprising the lid for storage battery according to claim 4.

7. A storage battery which includes a container made of synthetic resin in which an inside thereof is partitioned into a plurality of cells by partition walls, and an element is contained in each of the cells, and a lid to cover the container from above, wherein the lid comprises the terminal section for storage battery according to claim 1.

8. The terminal section for storage battery according to claim 1, wherein through-holes of the terminal are formed at least at three locations of the rectangular upper surface plate portion and the rectangular front surface plate portion, and at positions where screw holes of the nut communicating with the through-holes of the terminal do not intersect with each other, when the nut is inserted into the cavity portion of the terminal.

9. The nut for terminal according to claim 3, wherein the nut is a chamfered nut or a stepped nut to prevent wrong insertion in a vertical or horizontal direction into the cavity portion.

10. The nut for terminal according to claim 3, wherein the nut has a chamfered corner to prevent wrong insertion in a vertical or horizontal direction into the cavity portion.

11. The nut for terminal according to claim 3, wherein the nut has a stepped portion to prevent wrong insertion in a vertical or horizontal direction into the cavity portion.

12. The lid for storage battery according to claim 4, wherein through-holes of the terminal are formed at least at three locations of the rectangular upper surface plate portion and the rectangular front surface plate portion, and screw holes of the nut are formed at least at three locations of the location from the rectangular upper surface toward the lower surface and the location from the rectangular front surface toward the back surface, and at positions where the holes do not intersect with each other.

13. The lid for storage battery according to claim 4, wherein the nut is a chamfered nut or a stepped nut to prevent wrong insertion in a vertical or horizontal direction into the cavity portion.

14. The lid for storage battery according to claim 4, wherein the nut has a chamfered corner to prevent wrong insertion in a vertical or horizontal direction into the cavity portion.

15. The lid for storage battery according to claim 4, wherein the nut has a stepped portion to prevent wrong insertion in a vertical or horizontal direction into the cavity portion.

16. A storage battery comprising:
a container comprising cells and elements therein; and
a lid comprising a terminal having a cavity portion into which a nut is inserted, a bushing, and a conductive portion connecting the terminal and the bushing, the terminal having a rectangular parallelepiped shape, and through-holes of the terminal being formed at least at two locations of a rectangular upper surface plate portion and a rectangular front surface plate portion and at positions where screw holes of the nut communicating with the through-holes of the terminal do not intersect with each other when the nut is inserted into the cavity portion of the terminal, wherein the nut has a rectangular parallelepiped shape, and screw holes of the nut are formed at least at two locations of a location from a rectangular upper surface toward a lower surface and a location from a rectangular front surface toward a back surface, and at positions where the holes do not intersect with each other.

17. The storage battery according to claim 16, wherein one of the through-holes of the terminal is formed at a left or right-hand position of the rectangular upper surface plate portion, and the other through-hole is formed at an opposite right or left-hand position of the rectangular front surface plate portion.

\* \* \* \* \*